US008615235B2

(12) United States Patent  
Kubo et al.

(10) Patent No.: US 8,615,235 B2  
(45) Date of Patent: Dec. 24, 2013

(54) MOBILE COMMUNICATION TERMINAL AND POSITION REGISTRATION METHOD THEREOF, AND COMPUTER-READABLE STORAGE MEDIUM FOR COMPUTER PROGRAM

(75) Inventors: Keijirou Kubo, Fukuoka (JP); Kazuo Yano, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 12/642,341

(22) Filed: Dec. 18, 2009

(65) Prior Publication Data

US 2010/0099413 A1    Apr. 22, 2010

Related U.S. Application Data

(63) Continuation of application No. PCT/JP2007/000706, filed on Jun. 27, 2007.

(51) Int. Cl.
*H04W 4/00* (2009.01)
*H04W 36/00* (2009.01)

(52) U.S. Cl.
USPC ............. 455/435.2; 455/435.1; 455/436; 455/422.1; 370/331; 370/338

(58) Field of Classification Search
USPC ...................................... 455/435.2
See application file for complete search history.

(56) References Cited

U.S. PATENT DOCUMENTS 5,907,807 A *   5/1999 Chavez et al. .............. 455/436  
6,768,907 B1    7/2004 Mohebbi 2004/0192305 A1 * 9/2004 Namiki et al. ............. 455/435.1  
2007/0124074 A1   5/2007 Katoh et al.  
2008/0108348 A1 * 5/2008 Kottilingal et al. ....... 455/435.1

FOREIGN PATENT DOCUMENTS

| JP | 04213234 | | 8/1992 |
| JP | 05328431 | | 12/1993 |
| JP | 11008878 | | 1/1999 |
| JP | 2001-189966 | | 7/2001 |
| JP | 2002518962 | | 6/2002 |
| JP | 2003169361 | * | 6/2003 |
| JP | 2004064767 | * | 2/2004 |
| JP | 2007124133 | | 5/2007 |
| JP | 2007-150650 | | 6/2007 |

OTHER PUBLICATIONS

International Search Report dated Aug. 21, 2007.  
Japanese Official Communication dated Jul. 26, 2011 for corresponding Japanese Patent Application No. 2009-520159.

* cited by examiner

*Primary Examiner* — Timothy Pham  
(74) *Attorney, Agent, or Firm* — Fujitsu Patent Center (57) ABSTRACT

A mobile telephone terminal (2) is provided with an electrical field strength measurement unit (201) that receives radio signals from wireless base stations (31) and measures the strengths thereof; a registration destination base station selection unit (206) that selects one of the wireless base stations (31) that sent the received radio signals as a position registration destination; a position registration execution unit (203) that sends a position registration request to the selected wireless base station (31); and an execution timer expiry determination unit (210) that performs a position registration update process by causing, when a predetermined amount of time has elapsed following the position registration, the registration destination base station selection unit (206) to select a wireless base station (31), and causing the position registration execution unit (203) to send a position registration request to the selected wireless base station (31).

8 Claims, 8 Drawing Sheets

TLK

| CANDIDATE BASE STATION NUMBER | UPDATE INTERVAL TIME |
|---|---|
| 1 | — |
| 2 | 1 HOUR |
| 3 | 40 MINUTES |
| 4 | 30 MINUTES |
| 5 | 20 MINUTES |
| ⋮ | ⋮ |

MOBILE COMMUNICATION TERMINAL AND POSITION REGISTRATION METHOD THEREOF, AND COMPUTER-READABLE STORAGE MEDIUM FOR COMPUTER PROGRAM

CROSS-REFERENCE TO RELATED APPLICATIONS

This application is a continuing application, filed under 35 U.S.C. §111(a), of International Application PCT/JP2007/000706, filed on Jun. 27, 2007, the entire contents of which are incorporated herein by reference.

FIELD

The embodiment discussed herein is related to a mobile communication terminal in a wireless communication system, a method for registering position information of the mobile communication terminal, and the like.

BACKGROUND

Large numbers of mobile communication terminals (mobile devices, mobile stations) employed in wireless communication systems such as cellular phone systems are used simultaneously in areas where large numbers of people congregate, such as stations, shopping districts, and so on. Such areas have a much higher amount of persistent communication traffic than inactive areas, and thus it is highly possible that a large burden will be placed on a wireless base station. There are cases where, if a large burden is placed on a nearby wireless base station, mobile communication terminals are unable to carry out communication.

In addition, in facilities such as concert halls immediately following the end of an event, arrival gates at airports immediately following the arrival of an airplane, and so on, a large number of mobile communication terminals are powered on all at once. This causes a sharp increase in communication traffic, which may result in mobile communication terminals being unable to carry out communication.

In order to solve such a problem, measures are being taken whereby the number of wireless base stations is significantly increased in areas where large numbers of people congregate or areas where large numbers of mobile communication terminals are suddenly powered on.

However, a large degree of investment is necessary to install such wireless base stations, and the post-installation operations, maintenance, and so on also incur high costs. From the standpoint of environmental protection, it is desirable to aim for energy conservation, taking care so as not to increase the number of wireless base stations more than is necessary.

Furthermore, there are cases where it is difficult to secure space for increasing the number of wireless base stations in crowded areas such as city centers.

Therefore, rather than significantly increasing the number of wireless base stations, it is desirable instead to attempt to streamline communication services. Dispersing the position registrations of mobile communication terminals to multiple wireless base stations may be considered as a method to achieve such a goal.

Japanese Laid-open Patent Publication Nos. 04-213234 and 11-008878 disclose methods for causing a mobile communication terminal to select a wireless base station at the time of position registration. According to the method in Japanese Laid-open Patent Publication No. 04-213234, a mobile station (mobile communication terminal) receives broadcasting channel report information from each wireless base station, and based thereupon, selects the wireless base station with the most open channels.

According to the method in Japanese Laid-open Patent Publication No. 11-008878, a mobile station adjusts the condition of the radio signal between itself and base stations (wireless base stations) using the radio signal transmission power values of those base stations as parameters. The mobile station selects a base station based on the adjusted condition of the radio signal.

However, with conventional methods such as those disclosed in the Patent Publications described above, there is the possibility that position registrations are not effectively dispersed to multiple wireless base stations in areas where large numbers of people congregate, such as stations, shopping districts, and so on.

SUMMARY

A mobile communication terminal according to an aspect of the invention is a mobile communication terminal that communicates wirelessly. The mobile communication terminal includes a radio signal receiving portion that receives radio signals from wireless base stations, a wireless base station selection portion that selects one of the wireless base stations that have sent radio signals received by the radio signal receiving portion, a position registration requesting portion that sends a position registration request of the mobile communication terminal to the wireless base station selected by the wireless base station selection portion, and a position registration update processing portion that performs, after a predetermined amount of time has elapsed following the position registration, a position registration update process by causing the wireless base station selection portion to select a wireless base station and causing the position registration requesting portion to send a position registration request to the selected wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of cells in the vicinity of a facility and the state of mobile telephone terminals present in the vicinity thereof after a certain mobile telephone terminal has been powered on.

DESCRIPTION OF EMBODIMENT(S)

Preferred embodiments of the present invention will be explained with reference to accompanying drawings.

Figure 1:
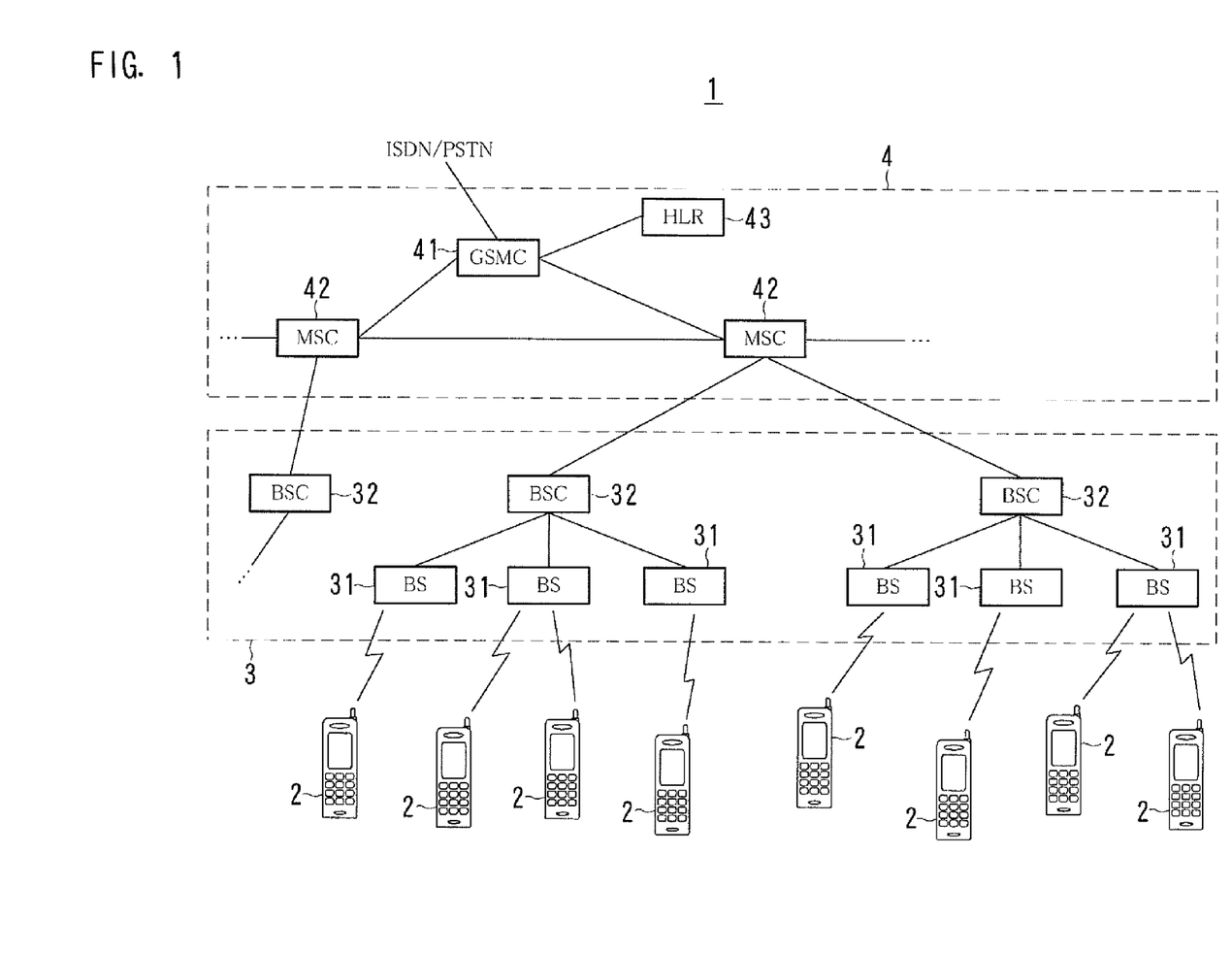
FIG. 1 is a diagram illustrating an example of the overall configuration of a mobile telephone system.

As illustrated in FIG. 1, a mobile telephone system 1 is a wireless communication system based on a standard such as CDMA2000 or W-CDMA, and is configured of a mobile telephone terminal 2 according to the present invention, a radio access network (RAN) 3, a core network (CN) 4, and so on.

The configurations of the radio access network 3 and the core network 4 are the same as conventional configurations. In other words, the radio access network 3 is configured of a wireless base station (BS) 31, a base station controller (BSC) 32, and so on, and the core network 4 is configured of a gateway mobile switching center (GMSC, or Gateway MSC) 41, a mobile services switching center (MSC) 42, a home location register (HLR) 43, and so on.

Note that there are cases where the wireless base station 31 is called a "Node B", a "base station", or the like. Furthermore, there are cases where the base station controller 32 is called an "RNC (radio network controller)". Hereinafter, there are cases where multiple wireless base stations 31 are distinguished from one another as "wireless base station 31A", "wireless base station 31B", "wireless base station 31C", and so on.

As per conventional technology, the mobile telephone terminal 2 is capable of telephony with other mobile telephone terminals 2 or landline telephone devices, the exchange of data such as e-mails, image data, and so on with other mobile telephone terminals 2 or personal computers, and so on via the radio access network 3, the core network 4, and so on.

Figure 2:
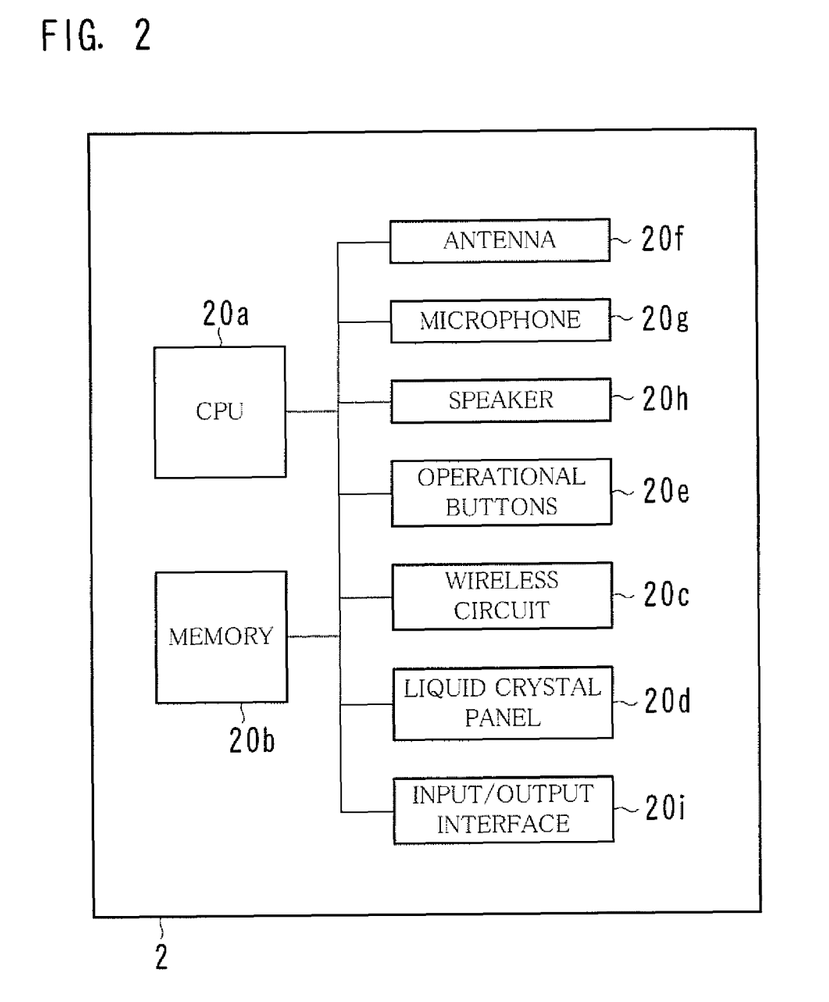
FIG. 2 is a diagram illustrating an example of the hardware configuration of a mobile telephone terminal.

As illustrated in FIG. 2, the mobile telephone terminal 2 is configured of a CPU 20a, a memory 20b, a wireless circuit 20c, a liquid crystal panel 20d, operational buttons 20e, an antenna 20f, a microphone 20g, a speaker 20h, an input/output interface 20i, and so on. Thus the hardware configuration of the mobile telephone terminal 2 is the same hardware configuration as a conventional mobile telephone terminal 2.

Figure 3:
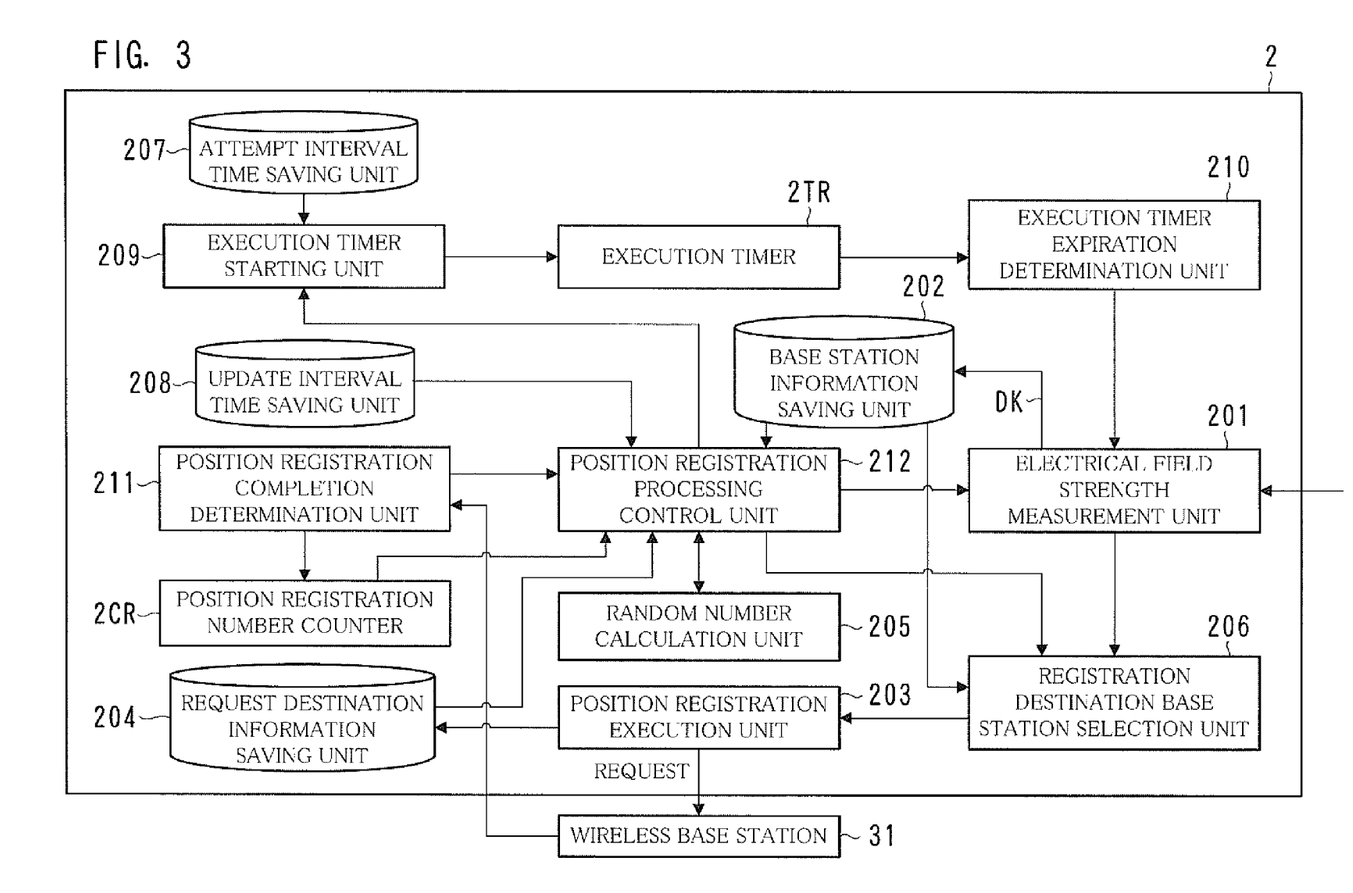
FIG. 3 is a diagram illustrating an example of the functional configuration of a mobile telephone terminal.

Furthermore, the software stored in the memory 20b is basically the same as conventional software. However, software (computer programs) for implementing the functions of an electrical field strength measurement unit 201, a base station information saving unit 202, a position registration execution unit 203, a request destination information saving unit 204, a random number calculation unit 205, a registration destination base station selection unit 206, an attempt interval time saving unit 207, an update interval time saving unit 208, an execution timer starting unit 209, an execution timer expiration determination unit 210, a position registration completion determination unit 211, a position registration processing control unit 212, an execution timer 2TR, a position registration number counter 2CR, and so on as illustrated in FIG. 3 are stored as software for selecting the wireless base station 31 that is to relay communication with the core network 4. The software is executed by the CPU 20a.

Next, the processing content of the various units within the mobile telephone terminal 2 illustrated in FIG. 3 shall be described in detail.

The electrical field strength measurement unit 201 measures, through a conventional method, the strength of the radio signal from the wireless base station 31 (in other words, the strength of the electrical field within the mobile telephone terminal 2 caused by the radio signal from the wireless base station 31) received by the antenna 20f built in the wireless telephone terminal 2.

In other words, the wireless base station 31 normally uses channels of predetermined frequencies, called "perch channels", "common channels", or "broadcasting channels", to send radio signals reporting identification information, control information, and so on of that wireless base station 31 itself. This identification information is, for example, a number added to each wireless base station 31 in advance.

As per conventional technology, the electrical field strength measurement unit 201 measures the strength of the electrical field caused by the radio signal of the perch channel as detected by the antenna 20f built in the mobile telephone terminal 2 itself.

Hereinafter, the strength of the electrical field measured by the electrical field strength measurement unit 201 shall be denoted as "electrical field strength DK". In addition, the electrical field strengths DK of the wireless base stations 31A, 31B, 31C, and so on may be denoted as "electrical field strength DKa", "electrical field strength DKb", "electrical field strength DKc", and so on in order to distinguish the strengths from one another.

The mobile telephone terminal 2 selects a wireless base station 31 to make a position registration request to from wireless base stations 31 whose measured electrical field strengths DK are greater than or equal to a predetermined threshold, thereby performing position registration with a wireless base station 31 that is at a level capable of guaranteeing a certain degree of service quality.

The base station information saving unit 202 saves, in association with each other, the identification information and the electrical field strengths of the wireless base stations 31 whose electrical field strengths DK are greater than or equal to the predetermined threshold, or in other words, wireless base stations 31 that are candidates for requesting position registration (position registration candidates).

The position registration execution unit 203 makes a position registration request for that mobile telephone terminal 2 itself to the wireless base station 31 selected by the registration destination base station selection unit 206, which shall be described later. The request destination information saving unit 204 saves the identification information of the wireless base station 31 to which the position registration request was made.

When the request is received by the wireless base station 31 and the position information of that mobile telephone terminal 2 is registered in that wireless base station 31 and the home location register 43 located thereabove, it is possible to connect to and communicate with terminal devices such as other mobile telephone terminals 2, landline telephone devices, personal computers, or the like via the core network 4 and so on.

The random number calculation unit 205 generates, based on the number of electrical field strengths DK detected (measured) by the electrical field strength measurement unit 201, a natural random number for selecting one of the wireless base stations 31 that emits a radio signal that mobile telephone terminal 2 is currently capable of receiving. In other words, in the case where one of N wireless base stations 31 is to be selected, one of "1" to "N" (where N is a natural number of 2 or more) is generated as the random number.

The registration destination base station selection unit 206 performs a process for selecting the wireless base station 31 that is to relay communication between that mobile telephone terminal 2 itself and the core network 4, or in other words, the wireless base station 31 in which to register the position information of that mobile telephone terminal 2 itself (the position registration destination). This process is carried out based on the electrical field strength DK measured by the electrical field strength measurement unit 201, the random number generated by the random number calculation unit 205, and so on.

Incidentally, in the case where multiple wireless base stations 31 are present in the vicinity of a conventional mobile telephone terminal, that mobile telephone terminal will attempt to register its position information (position registration) in the wireless base station 31 that has the highest (strongest) electrical field strength DK. If the position registration fails, the mobile telephone terminal measures the electrical field strengths DK of the wireless base stations 31 once again after a predetermined amount of time has elapsed, and then attempts position registration with the wireless base station 31 having the highest electrical field strength DK.

As opposed to this, the mobile telephone terminal 2 according to the present embodiment does not always attempt position registration with the wireless base station 31 having the highest electrical field strength DK, and also attempts position registration with other wireless base stations 31. Specifically, this is carried out as follows.

First, when performing the first position registration, the mobile telephone terminal 2 attempts position registration with the wireless base station 31 having the highest electrical field strength DK. If that position registration fails, the mobile telephone terminal 2 selects the wireless base station 31 corresponding to the random number generated by the random number calculation unit 205 as the registration destination for its position information. The association between a random number and a wireless base station 31 is determined in the following manner in advance. For example, random numbers "1", "2", "3", and so on are associated with electrical field strengths DK from the highest strength down. Alternatively, the random numbers may be associated with identification information from the newest information to the oldest.

Furthermore, upon the completion of position registration, a conventional mobile telephone terminal normally maintains the status of position registration with the same wireless base station 31 until the mobile telephone terminal is restarted, the reception synchronization is broken, or the mobile telephone terminal moves to the area of another wireless base station 31, and does not perform position registration again.

As opposed to this, the mobile telephone terminal 2 according to the present embodiment performs position registration again after a predetermined amount of time has elapsed following the last position registration, thereby performing a process for updating the wireless base station 31 that is the position registration destination (position registration update).

The attempt interval time saving unit 207 saves, in the case where position registration has failed, the amount of time until the next position registration commences (denoted as "attempt interval time Ta" hereinafter). This attempt interval time Ta is a short amount of time, of approximately several microseconds. The update interval time saving unit 208 saves an update interval time table TLK regarding the amount of time from when the position registration is completed to when the update of the position registration is commenced (denoted as "update interval time Tb" hereinafter).

Figure 4:
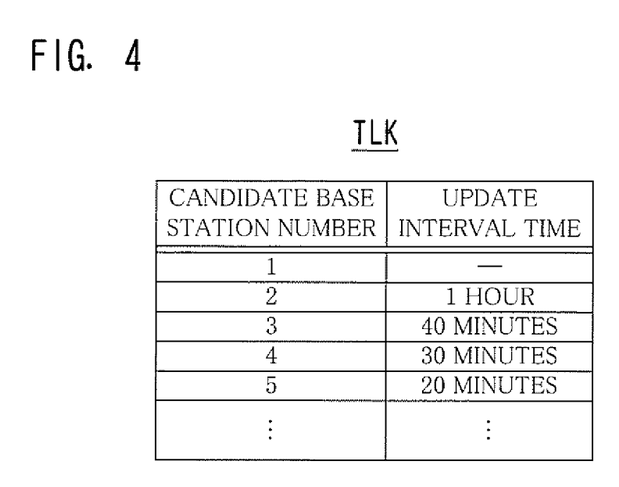
FIG. 4 is a diagram illustrating an example of an update interval time table.

As illustrated in FIG. 4, the update interval time table TLK indicates update interval times Tb in association with each number of wireless base stations 31 serving as position registration candidates (each candidate base station number). In the present embodiment, shorter update interval times Tb are set as that number grows.

The execution timer 2TR is a timer for detecting the passage of an amount of time that has been set. The execution timer starting unit 209 obtains the attempt interval time Ta or the update interval time Tb based on an instruction from the position registration processing control unit 212, sets that time in the execution timer 2TR, and starts the timer. The execution timer expiry determination unit 210 accepts a notification indicating that the amount of time set in the execution timer 2TR has been measured upon that measurement occurring. The electrical field strength measurement unit 201 is then caused to measure the electrical field strength DK; the registration destination base station selection unit 206 is caused to select a wireless base station 31; and the position registration execution unit 203 is caused to execute the position registration process.

The position registration number counter 2CR counts the number of times position registration has been performed. Note that this counter is reset when position registration is carried out at a timing aside from a position registration update, such as the mobile telephone terminal 2 being restarted, moving to the area of a different wireless base station 31, when the reception synchronization is broken, or the like.

The position registration completion determination unit 211 determines whether or not the position registration in the wireless base station 31 and home location register 43 has been successful (completed). The position registration completion determination unit 211 also increments the position registration number counter 2CR by one in the case where the position registration has been completed.

The position registration processing control unit 212 performs overall control of the position registration process based on the result of the determination performed by the position registration completion determination unit 211, the number indicated by the position registration number counter 2CR, and so on.

In the case where the result of the determination performed by the position registration completion determination unit 211 indicates failure, a command is issued to the execution timer starting unit 209 so as to set the attempt interval time Ta saved in the attempt interval time saving unit 207 and start the execution timer 2TR.

In the case where the result of the determination indicates success, a command is issued to the execution timer starting unit 209 so as to set the update interval time Tb saved in the update interval time saving unit 208 and start the execution timer 2TR.

Figure 5:
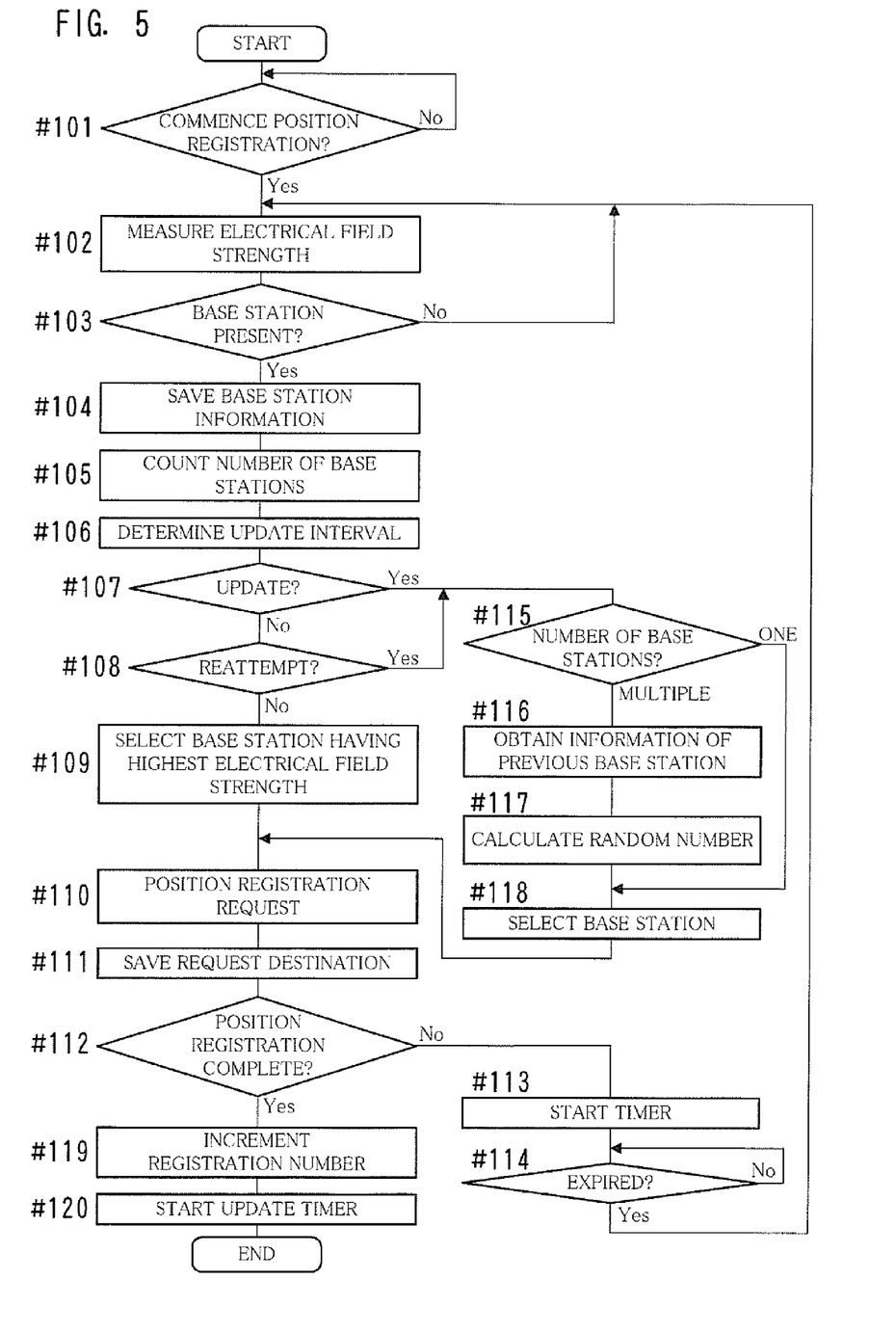
FIG. 5 is a flowchart illustrating an example of the processing flow of position registration.

Next, the flow of the position registration process for the mobile telephone terminal 2 shall be described with reference to FIG. 5. Upon being powered on, breaking reception synchronization, moving to the area of another wireless base station 31, having its position information updated, or the like, the mobile telephone terminal 2 commences the process for position registration (Yes in #101 of FIG. 5). This process is executed by the various elements of the mobile telephone terminal 2 according to a procedure such as that described hereinafter.

First, the position registration processing control unit 212 resets the value of the position registration number counter 2CR to "1". Then, the position registration processing control unit 212 sends a command to the electrical field strength measurement unit 201 so as to measure the electrical field strength DK.

Then, the electrical field strength measurement unit 201 measures the electrical field strengths DK of the wireless base stations 31 in the periphery (#102). In the case where there are wireless base stations 31 for which the measured electrical field strength DK is greater than or equal to a predetermined threshold (Yes in #103), the identification information of those wireless base stations 31, or in other words, the wireless base stations 31 serving as position registration candidates, is saved in the base station information saving unit 202 (#104), and the number thereof is counted (#105). Here, the position registration processing control unit 212 refers to the update interval time table TLK, and determines the update interval time Tb based on the number therein (#106). In the case where there are no wireless base stations 31 to serve as position registration candidates, or in other words, in the case where there are no wireless base stations 31 capable of position registration (No in #103), the measurement of the electrical field strengths DK is performed once again (#102).

Here, the value of the position registration number counter 2CR is "1", and therefore the position registration processing control unit 212 recognizes that the current position registration is not an update of a position registration, but is rather a new position registration (No in #107). Furthermore, because the present process is the first attempt, or in other words, is not the process of a second attempt following a failed position registration (No in #108), the processes in steps #109 and on are executed.

At this time, the registration destination base station selection unit 206 selects the wireless base station 31 having the highest measured electrical field strength DK as the position registration destination (#109). The position registration execution unit 203 sends a position registration request to the selected wireless base station 31 (#110). The identification information of that wireless base station 31 is then saved in the request destination information saving unit 204 (#111).

After the position registration request has been made, the position registration completion determination unit 211 determines whether that position registration has succeeded or failed based on a signal or the like from the requested wireless base station 31, and notifies the position registration processing control unit 212 of the result.

If notified of a failure (No in #112), the position registration processing control unit 212 sends a command to the execution timer starting unit 209 to start the execution timer 2TR in order to reattempt position registration. Upon doing so, the execution timer starting unit 209 obtains the attempt interval time Ta, sets that time, and starts the execution timer 2TR (#113). This starts the execution timer 2TR.

Upon determining that the time measured by the execution timer 2TR indicates that the attempt interval time Ta has elapsed (Yes in #114), the execution timer expiry determination unit 210 commences a process for reattempting position registration. At this time, a command is sent to the electrical field strength measurement unit 201 so as to measure the electrical field strength DK.

Then, the electrical field strength measurement unit 201 once again measures the electrical field strengths DK of the wireless base stations 31 in the periphery (#102). Thereafter, the processes of steps #103 and on are executed in the same manner.

Because the current process is a reattempt following the failure of position registration (Yes in #108), the processes of steps #115 and on are executed.

At this time, in the case where the number of wireless base stations 31 serving as position registration candidates counted in step number 105 is 1 (One in #115), the registration destination base station selection unit 206 selects that wireless base station 31 as the position registration destination (#118).

In the case where there are multiple wireless base stations 31 (Multiple in #115), a process for selecting a position registration destination at random from the wireless base stations 31 aside from the station requested in the previous position registration is performed based on the random number outputted by the random number calculation unit 205. At this time, the position registration processing control unit 212 obtains the identification information saved in the request destination information saving unit 204 (#116), and causes the random number calculation unit 205 to generate random numbers corresponding to the wireless base stations 31 aside from the wireless base station 31 to which that identification information belongs (the wireless base station 31 for which the previous position registration failed) (#117).

To be more specific, in the case where, for example, the number of wireless base stations 31 serving as position registration candidates whose identification information was saved in step #104 is 3, the numbers "1" and "2" are allocated to the two wireless base stations 31 aside from the wireless base station 31 for which the previous position registration was requested. The random number calculation unit 205 is then caused to generate a random number with a value of either "1" or "2".

The registration destination base station selection unit 206 selects the wireless base station 31 corresponding to the value outputted from the random number calculation unit 205 as the position registration destination (#118). Note that in the case where there are two wireless base stations 31 serving as position registration candidates, only one wireless base station 31 remains aside from the wireless base station 31 for which the previous position registration failed, and thus in that case, that remaining wireless base station 31 may be selected without causing a random number to be generated. Meanwhile, in the case where there is only one wireless base station 31 serving as a position registration candidate, that wireless base station 31 is selected as the position registration destination regardless of whether or not it is the wireless base station 31 for which the position registration failed.

The position registration execution unit 203 sends a position registration request to the selected wireless base station 31 (#110). The identification information of that wireless base station 31 is then saved in the request destination information saving unit 204 (#111). Here, in the case where the position registration has failed once again, the processes of steps #113 and on are carried out in the same manner. In other words, the electrical field strength DK measurement is performed once again after the attempt interval time Ta has elapsed; a wireless base station 31 aside from the wireless base station 31 for which the position registration has failed here is selected based on the value of a random number; and position registration is attempted.

On the other hand, in the case where the position registration is completed (Yes in #112), the position registration completion determination unit 211 determines that the position registration has succeeded, and along with notifying the position registration processing control unit 212 of the success, increments the value of the position registration number counter 2CR by one (#119). As a result, the value of the position registration counter 2CR becomes "2".

Upon being notified of the position registration success, the position registration processing control unit 212 sends a command to the execution timer starting unit 209 to start the execution timer 2TR for updating the position registration. The execution timer starting unit 209 then sets the update interval time Tb determined in step #106, and starts the execution timer 2TR (#120).

Upon determining that the time measured by the execution timer 2TR indicates that the update interval time Tb has elapsed, the execution timer expiry determination unit 210 commences a process for a position registration update (Yes in #101). At this time, the electrical field strength measurement unit 201 is caused to measure the electrical field strength DK (#102). Thereafter, the processes of steps #103 and on are executed in the same manner, and the process for updating the position registration is carried out.

In this process, the value of the position registration number counter 2CR is "2", and therefore the position registration processing control unit 212 recognizes that the current position registration is the second position registration, or in other words, is a position registration update (Yes in #107). In this case, the processes of steps #115 and on are executed.

In the case where the number of wireless base stations 31 serving as position registration candidates is 1 (One in #115), the registration destination base station selection unit 206 selects that wireless base station 31 as the position registration destination (#118). The position registration execution unit 203 then makes a request for position registration to that wireless base station 31 (#110).

In the case where the number of wireless base stations 31 serving as position registration candidates is two or more (Multiple in #115), the position registration destination is selected based on the value of a random number outputted by the random number calculation unit 205.

At this time, the position registration processing control unit 212 obtains the identification information saved in the request destination information saving unit 204 (#116), and causes the random number calculation unit 205 to generate random numbers corresponding to the wireless base stations 31 aside from the wireless base station 31 to which that identification information belongs (the wireless base station 31 that is the destination of the current position registration) (#117).

The registration destination base station selection unit 206 then selects the wireless base station 31 corresponding to the value of the outputted random number as the position registration destination (#118). The position registration execution unit 203 then makes a request for position registration to that wireless base station 31 (#110).

Thereafter, the processes of steps #111 and on are executed in the same manner. In other words, in the case where position registration has failed (No in #112), a wireless base station 31 aside from the wireless base station 31 for which the position registration failed is once again selected based on a random number after the attempt interval time Ta has elapsed, and a position registration request is made once again. In the case where the position registration has succeeded (Yes in #112), the position registration number is incremented, and the value thereof is updated to "3" (#119). The execution timer 2TR is started so that position registration update is commenced once again after the update interval time Tb has elapsed (#120).

Figure 6:
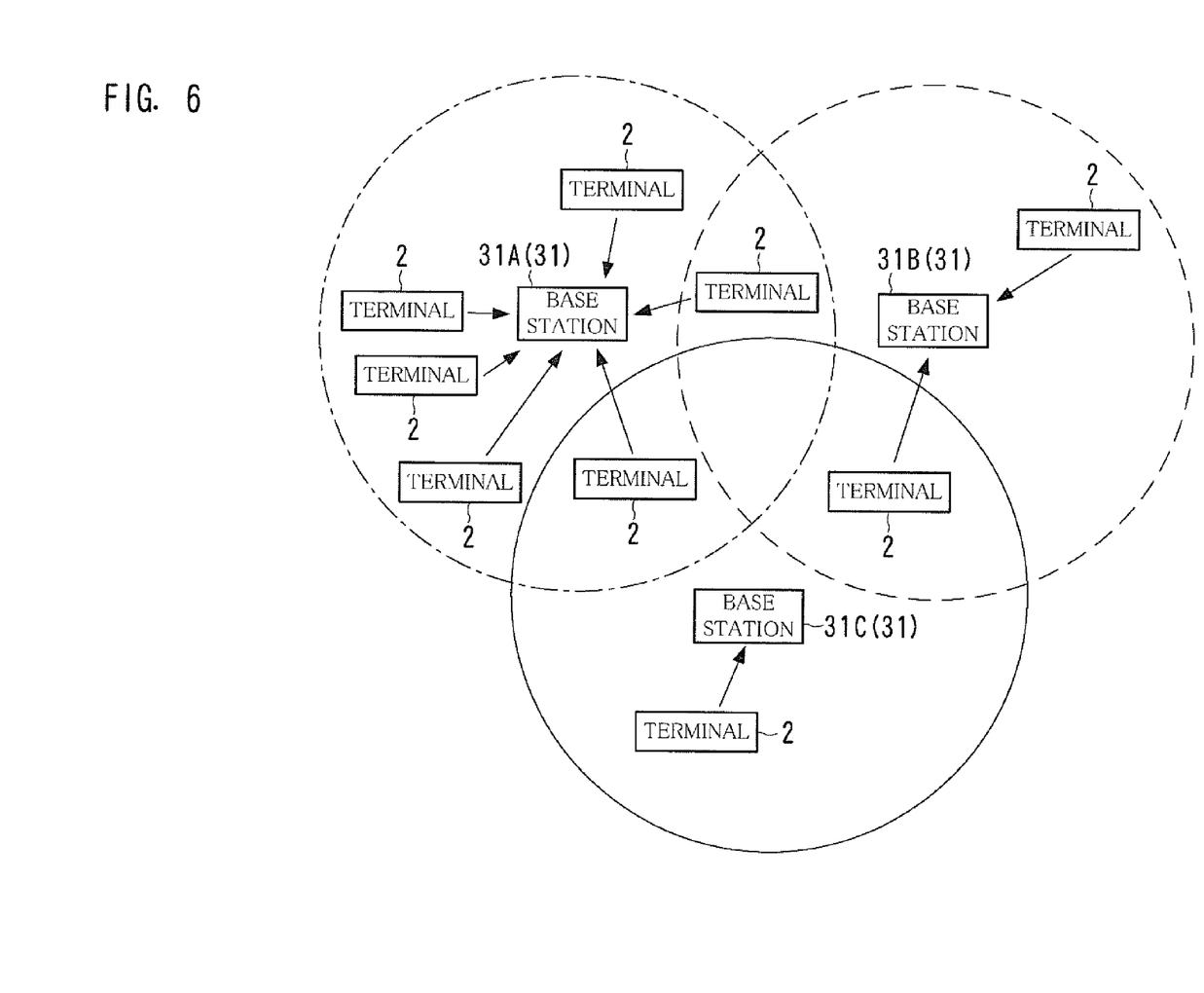
FIG. 6 is a diagram illustrating an example of cells in the vicinity of a certain facility and the state of mobile telephone terminals present in the vicinity thereof.

Next, position registration processing performed by the mobile telephone terminal 2X of a certain visitor X in the case where visitors simultaneously power on their mobile telephone terminals 2 following the end of an event carried out at a facility such as a concert hall or a stadium shall be described with reference to FIG. 6 through FIG. 8.

When the event has ended and the use of the mobile telephone terminals 2 is once again allowed, the visitors power on their mobile telephone terminals 2 all at once. Because the visitors are gathered in a specific area, the position registrations of their mobile telephone terminals 2 are concentrated on a specific wireless base station 31. In the example in FIG. 6, the registrations are concentrated on the wireless base station 31A.

Figure 7:
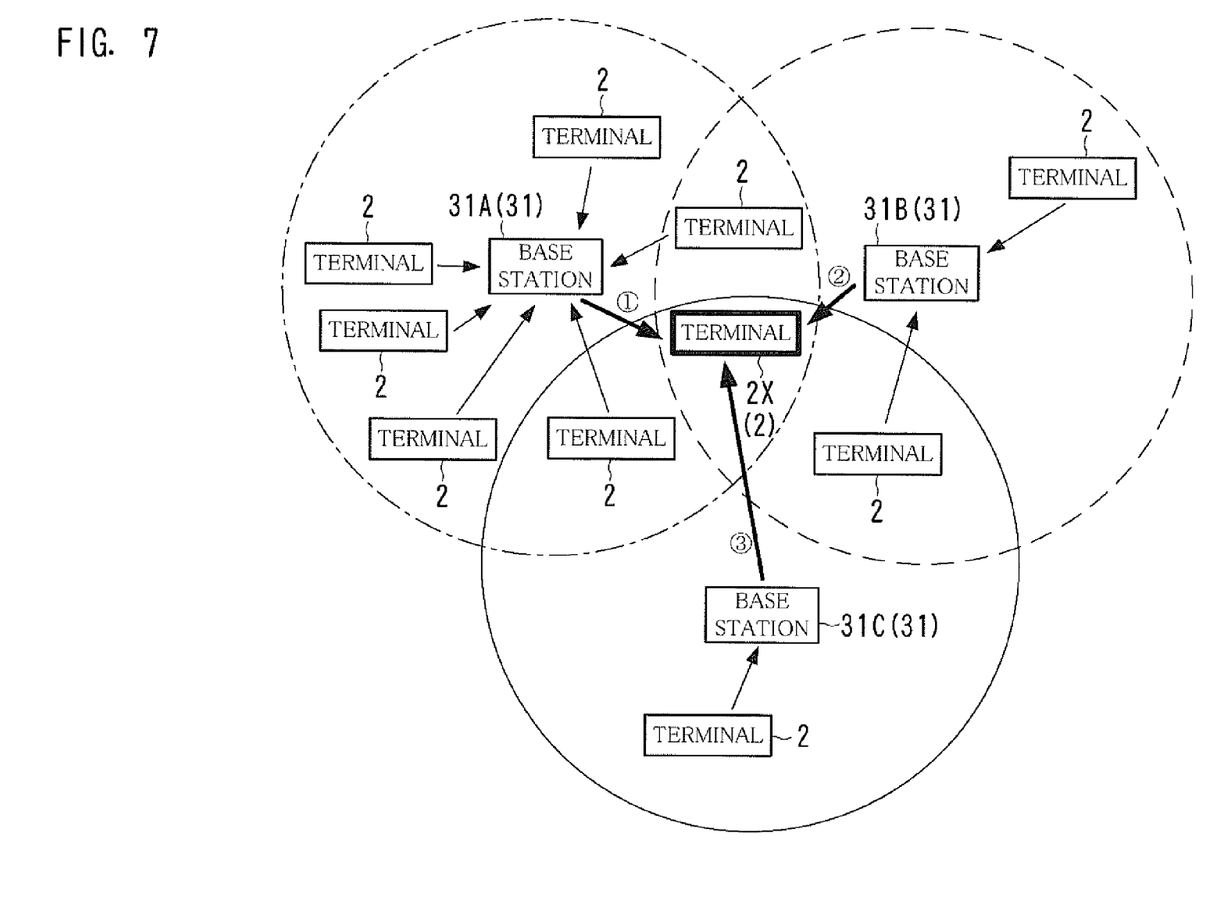

Here, if the certain visitor X powers on his/her mobile telephone terminal 2 (2X) after the other visitors, the mobile telephone terminal 2X will, as indicated by the numbers contained in circles in FIG. 7, measure the electrical field strengths DKa, DKb, and DKc of the wireless base stations 31A, 31B, and 31C in the periphery of the mobile telephone terminal 2X. Here, it is assumed that the electrical field strength DKa is the highest. To simplify the descriptions, it shall be assumed that the order of the magnitudes of the electrical field strengths DK does not change hereafter. Note that in FIG. 7, the dot-dash line circle expresses the range of the cell of the wireless base station 31A, the dotted line circle expresses the range of the cell of the wireless base station 31B, and the solid line circle expresses the range of the cell of the wireless base station 31C.

First, the mobile telephone terminal 2X attempts position registration with the wireless base station 31 having the highest electrical field strength DK, or in other words, the wireless base station 31A.

If position registration with the wireless base station 31A fails, the mobile telephone terminal 2X re-measures each electrical field strength DK, selects, based on a random number value, a wireless base station 31 aside from the wireless base station 31A, or in other words, the wireless base station 31B or 31C, and attempts position registration therewith.

If the position registration succeeds, the update interval time Tb is set and the execution timer 2TR is started. According to the update interval time table TLK in FIG. 4, "40 minutes" is set in the case where there are three wireless base stations 31 serving as position registration candidates.

Therefore, when 40 minutes has elapsed following the completion of position registration, the mobile telephone terminal 2 performs a process for updating the position registration. In the position registration performed in this update, a wireless base station 31 aside from the wireless base station 31 with which the previous position registration was performed is selected as the position registration destination. For example, if the previous position registration destination was the wireless base station 31B, the wireless base station 31A or 31C is selected this time based on the value of a random number. If the position registration succeeds, the execution timer 2TR is once again started so that the position registration update is executed 40 minutes later.

If, in the second position registration, the wireless base station 31C has been selected, the wireless base stations 31A and 31B are possible selection targets in the next position registration update. Alternatively, the wireless base stations 31B and 31C, which have already been selected as position registration destinations, may be excluded, and the wireless base station 31A selected. In this case, the identification information of the wireless base stations 31 for which position registration has succeeded after the initial position registration is saved in the request destination information saving unit 204, and the wireless base stations 31 with which position registration has been performed in the past are excluded from the selection by referring thereto. In addition, when the initial position registration is performed, such as when the mobile telephone terminal 2 is powered on, the identification information in the request destination information saving unit 204 is deleted.

Figure 8:
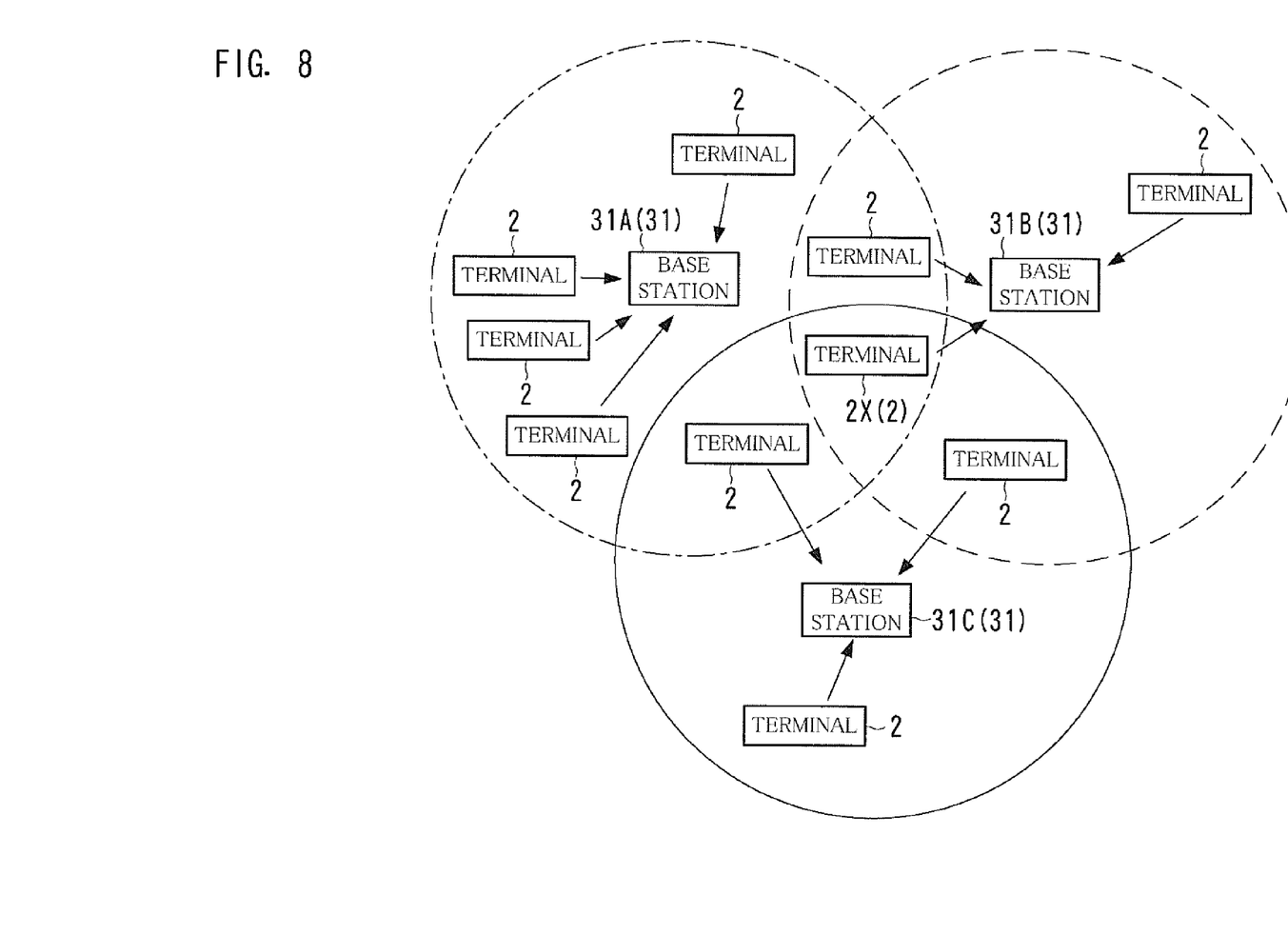
FIG. 8 is a diagram illustrating an example of cells in the vicinity of a facility and the state of the mobile telephone terminals after the position registration of each mobile telephone terminal has been updated.

By each mobile telephone terminal 2 in the vicinity performing such position registration updates, the position registration is dispersed among multiple wireless base stations 31, thereby making it possible to distribute the burden, as illustrated in FIG. 8.

According to the present embodiment, in the case where a mobile telephone terminal 2 has failed at and therefore reattempts position registration, that mobile telephone terminal 2 selects a wireless base station 31 different from the previous time as the position registration destination. Therefore, position registration requests sent simultaneously by multiple mobile telephone terminals 2 located in the periphery may be effectively dispersed.

In general, in locations where traffic is likely to increase, such as shopping districts and the like, the increase in traffic is handled by increasing the number of wireless base stations that cover the same area. However, even if multiple wireless base stations are deployed, it is often the case that the electrical field strengths of the wireless base stations in that area are not uniform, due to factors such as geographics, the conditions of roadways, building layout conditions, and so on. Because position registration is normally performed with a wireless base station having a high electrical field strength, there is a tendency for position registration requests to be concentrated on a specific wireless base station in such locations. This makes it more likely for position registration to fail. In the case where position registration has failed, the position registration is repeatedly reattempted with that wireless base station that has a high electrical field strength, resulting in a sharp increase in traffic with that wireless base station. This not only makes it impossible for that wireless base station to realize its strength to the fullest extent, but also results in situations where communication itself is unable to be carried out. According to the present embodiment, the position registration requests are effectively dispersed, thereby suppressing a sharp increase in traffic and reducing adverse effects such as those described above. Furthermore, the certainty of position registration may be increased.

Meanwhile, there are also cases where wireless base stations having high electrical field strengths experience a gradual increase in traffic in locations where large numbers of people congregate, such as shopping districts and the like. There are situations where communication is unable to be carried out even when the increase in traffic is gradual. According to the present embodiment, even if position registration succeeds, the position registration is re-executed with a different wireless base station 31 after a predetermined amount of time has elapsed, thereby preventing a concentration of position registrations in a specific wireless base station 31 and making it difficult for such a gradual increase of traffic to occur. Through this, the adverse effects described above may be reduced, and the certainty of position registration may be further increased.

As described above, in the present embodiment, after position registration has been completed once, the position registration is executed again after a predetermined amount of time has elapsed, and the position registration destination is updated to a wireless base station that is appropriate for that point in time. Therefore, in the case where multiple mobile communication terminals are present within a predetermined area, the position registrations thereof may be dispersed among multiple wireless base stations by appropriately updating the position registration destinations at a predetermined timing.

Although the wireless base station 31 having the highest electrical field strength DK is selected for the initial position registration in the present embodiment, this selection may be performed based on a random number from the outset. In this case, numbers are allocated to all wireless base stations 31 determined to be position registration candidates, and a random number corresponding to one of those numbers is generated.

In the present embodiment, the update interval time Tb is set shorter as the number of wireless base stations 31 serving as position registration candidates increases. However, because performing the position registration process requires the mobile telephone terminal 2 to consume battery power, it is preferable to not perform the position registration too frequently. Therefore, for example, a lower limit value of approximately 20 minutes may be determined, and times shorter than that may be prevented from being set. The update cycle may be set to be variable using software, and thus may be tuned to an optimal setting depending on the circumstances.

In the present embodiment, when, during the position registration update, there is only one wireless base station 31 to serve as a position registration request destination candidate, that wireless base station 31 is selected and position registration performed. However, in the case where that wireless base station 31 is the same as the wireless base station 31 with which the current position registration is being performed, it is not necessary to carry out position registration once again. Therefore, in the case where there is only one wireless base station 31 serving as a position registration candidate, it may be checked whether or not that wireless base station 31 is the same as the wireless base station 31 with which the current position registration is being performed by referring to the identification information saved in the request destination information saving unit 204, and if it is the same wireless base station, the position registration process may be deferred.

Although the electrical field strengths are re-measured during the reattempt following the failure of position registration in the present embodiment, the identification information, electrical field strengths DK, and so on saved in the base station information saving unit 202 during the previous measurement may be reused instead of re-measuring.

Although the present embodiment describes an example of a wireless telephone terminal 2 (mobile station) used in a wireless communication system based on a standard such as CDMA2000 or W-CDMA, the present invention is also applicable to mobile stations in other types of wireless communication systems, such as a wireless LAN mobile station, a PHS mobile station, or the like.

In addition, modifications of the configurations, processing content, and processing order of all or part of the mobile telephone system 1 and the mobile telephone terminal 2, the configuration of the update interval time table TLK, and so on are possible within the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication terminal that communicates wirelessly, comprising:
  a radio signal receiving portion that receives radio signals from wireless base stations;
  a selection portion that selects one of the wireless base stations that have sent radio signals received by the radio signal receiving portion;

a position registration requesting portion that sends a position registration request of the mobile communication terminal to the wireless base station selected by the selection portion; and a position registration update processing portion that performs, after a predetermined amount of time has elapsed following the position registration, a position registration update process by causing the selection portion to select a wireless base station and causing the position registration requesting portion to send a position registration request to the selected wireless base station; wherein the predetermined amount of time is set to be a shorter amount of time as a quantity of wireless base stations from which radio signals have been received by the radio signal receiving portion increases.

2. The mobile communication terminal according to claim 1, wherein, during the position registration update process, in the case where the radio signal receiving portion has received radio signals from multiple wireless base stations, the selection portion selects one of the multiple wireless base stations aside from the wireless base station with which the position registration is valid.

3. The mobile communication terminal according to claim 1, wherein the selection portion selects one of wireless base stations for which a strength of the radio signal received by the radio signal receiving portion is greater than or equal to a predetermined threshold.

4. The mobile communication terminal according to claim 3, wherein in the case where, at the time of the position registration update process, there is one wireless base station for which a strength of the radio signal received by the radio signal receiving portion is greater than or equal to the predetermined threshold, the position registration update processing portion does not make a request for position registration to the one wireless base station.

5. A mobile communication terminal that communicates wirelessly, comprising:

a radio signal receiving portion that receives radio signals from wireless base stations;

a selection portion that selects one of the wireless base stations that have sent radio signals received by the radio signal receiving portion;

a position registration requesting portion that sends a position registration request of the mobile communication terminal to the wireless base station selected by the selection portion; and a position registration update processing portion that performs, after a predetermined amount of time has elapsed following the position registration, a position registration update process by causing the selection portion to select a wireless base station and causing the position registration requesting portion to send a position registration request to the selected wireless base station; wherein the selection portion selects one of wireless base stations for which a strength of the radio signal received by the radio signal receiving portion is greater than or equal to a predetermined threshold, in the case where, at the time of the position registration update process, there is one wireless base station for which a strength of the radio signal received by the radio signal receiving portion is greater than or equal to the predetermined threshold, the position registration update processing portion does not make a request for position registration to the one wireless base station, and a position registration reattempt processing portion that, in the case where position registration has failed and there are multiple wireless base stations for which a strength of the radio signal received by the radio signal receiving portion is greater than or equal to the predetermined threshold, causes the selection portion to select one wireless base station at random from the multiple wireless base stations excluding the wireless base station for which the position registration has failed, and causes the position registration requesting portion to resend a position registration request to the selected wireless base station.

6. A position registration method for a mobile communication terminal that communicates wirelessly, the method comprising:

receiving radio signals from wireless base stations;

selecting one of the wireless base stations that have sent received radio signals;

sending a position registration request of the mobile communication terminal to the selected wireless base station; and updating position registration after a predetermined amount of time has elapsed following the position registration by re-receiving radio signals from the wireless base stations, selecting one of the wireless base stations that have sent received radio signals, and sending a position registration request to the selected wireless base station; wherein the predetermined amount of time is set to be a shorter amount of time as a quantity of wireless base stations from which radio signals have been received increases.

7. The position registration method according to claim 6, wherein in the updating, in the case where radio signals from multiple wireless base stations have been received, one of the multiple wireless base stations, aside from the wireless base station with which the position registration is valid, is selected at random.

8. A position registration method for a mobile communication terminal that communicates wirelessly, the method comprising:

receiving radio signals from wireless base stations;

sending a position registration request of the mobile communication terminal to the wireless base station that has sent a strongest radio signal among the radio signals thus received;

in the case where radio signals have been received from multiple wireless base stations and position registration in the sending has failed, selecting one wireless base station at random from the multiple wireless base stations excluding the wireless base station for which the position registration has failed, and resending a position registration request to the selected wireless base station; and updating the position registration after a predetermined amount of time has elapsed following the position registration by re-receiving radio signals from the wireless base stations, selecting one wireless base station at random from the multiple wireless base stations excluding the wireless base station for which the previous position registration has failed, and sending a position registration request to the selected wireless base station.

* * * * *